Figure 1:
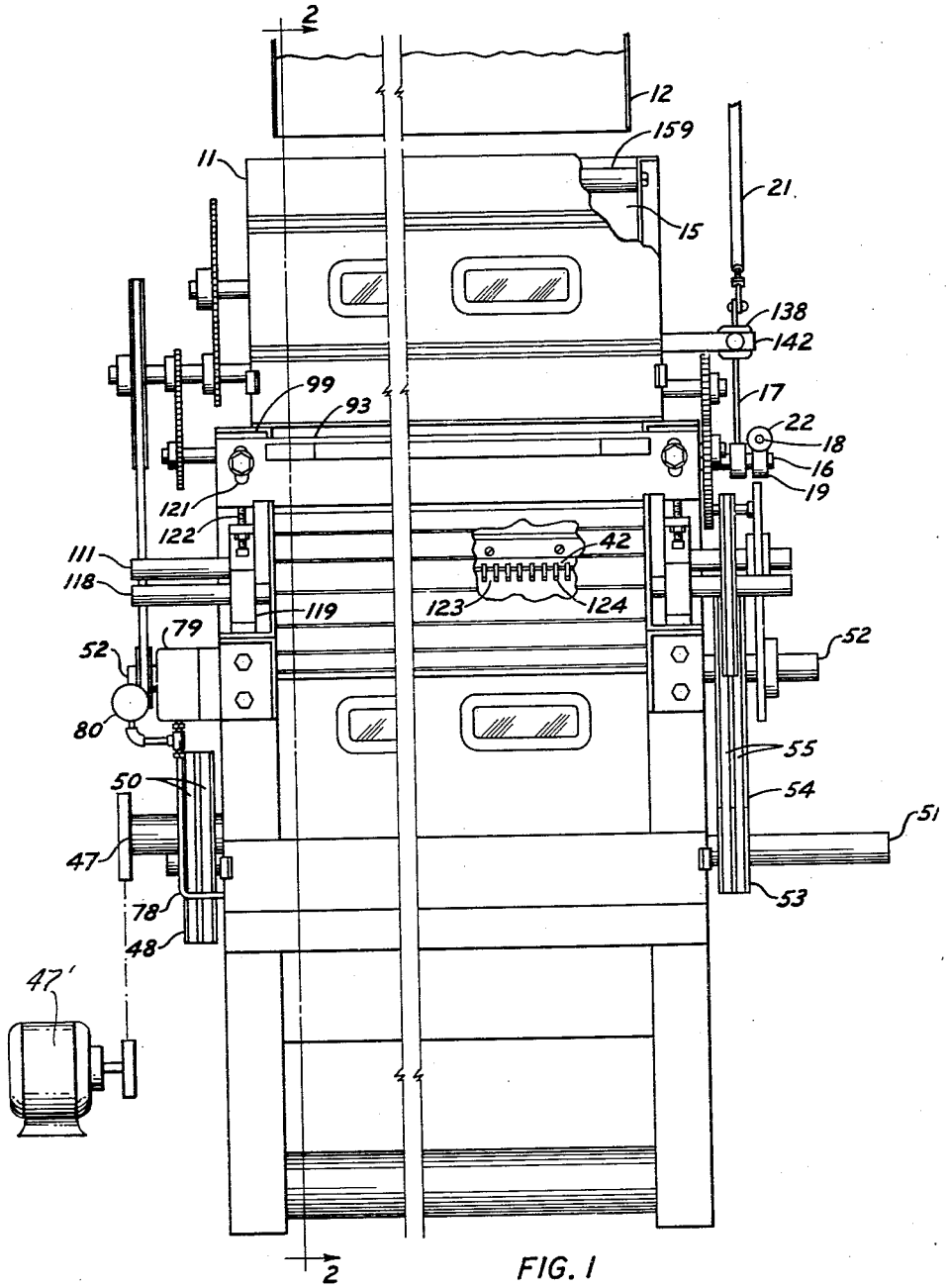

Aug. 8, 1961    F. E. DEEMS    2,994,926
ROLLER COTTON GIN
Filed Jan. 2, 1959    7 Sheets-Sheet 1

INVENTOR.
FRANK E. DEEMS
BY

Aug. 8, 1961  F. E. DEEMS  2,994,926
ROLLER COTTON GIN

Filed Jan. 2, 1959  7 Sheets-Sheet 2

INVENTOR.
FRANK E. DEEMS
BY

Aug. 8, 1961    F. E. DEEMS    2,994,926
ROLLER COTTON GIN
Filed Jan. 2, 1959    7 Sheets-Sheet 3

INVENTOR.
FRANK E. DEEMS
BY

INVENTOR.
FRANK E. DEEMS

Aug. 8, 1961    F. E. DEEMS    2,994,926
ROLLER COTTON GIN

Filed Jan. 2, 1959    7 Sheets-Sheet 5

INVENTOR.
FRANK E. DEEMS
BY

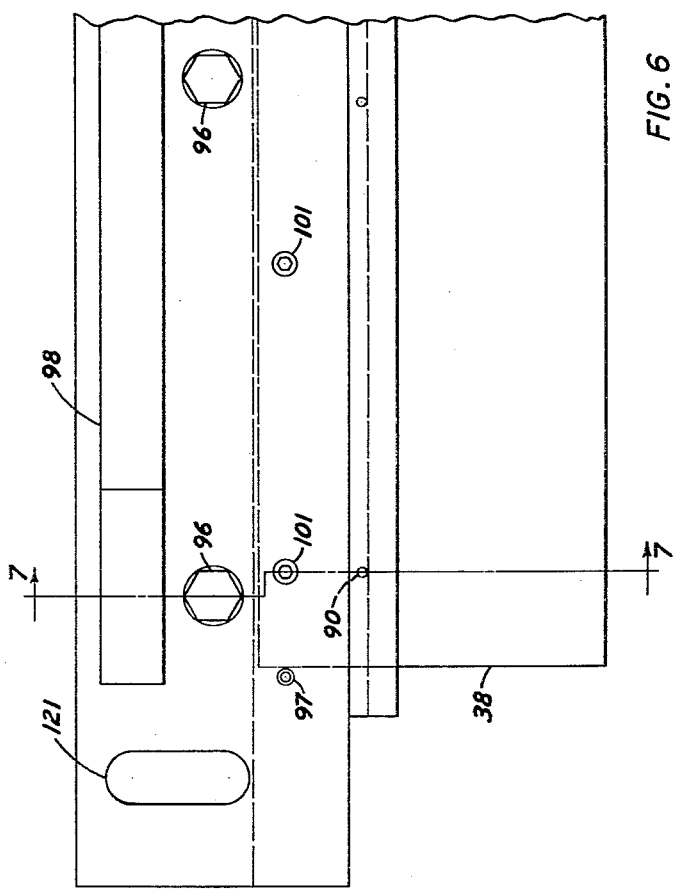
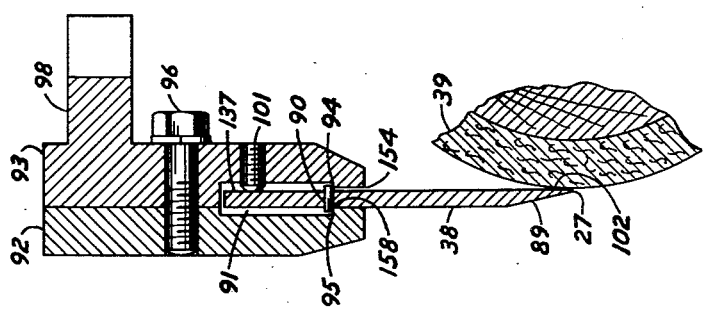
INVENTOR.
FRANK E. DEEMS

Aug. 8, 1961 F. E. DEEMS 2,994,926
ROLLER COTTON GIN

Filed Jan. 2, 1959 7 Sheets-Sheet 7

INVENTOR.
FRANK E. DEEMS
BY

United States Patent Office 2,994,926
Patented Aug. 8, 1961

2,994,926
ROLLER COTTON GIN
Frank E. Deems, Birmingham, Ala., assignor to Continental Gin Company, Birmingham, Ala., a corporation of Delaware
Filed Jan. 2, 1959, Ser. No. 784,654
20 Claims. (Cl. 19—52)

The present invention relates to improvements in cotton gin apparatus and is particularly concerned with such improvements in a roller cotton gin.

Roller cotton gins are designed and constructed as integrated units, receiving the seed cotton, feeding it at a controlled rate to the gin roller, and being operative for separating seed from the lint and separately removing the lint and ginned seed from the apparatus.

Gins of this nature are characterized in having a knife that reciprocates in the general vertical direction operable for dislodging the seed from the cotton fiber at the edge of a fixed doctor knife over which the cotton to be ginned is fed.

Due to the rapid oscillation of parts of the roller gin that are so actuated to feed the cotton, and the rapidly reciprocating knife structure, roller gins are subjected to extreme vibration and stresses caused by the vibration which in the past have led to frequent shutdowns on account of bearing failures or on account of the adjustment of linkages provided in the apparatus to adjust the various moving parts relative to each other. The frequency of shutdown of roller gins has prevented full realization of the advantages of this type of ginning equipment. Such gins are employed principally in the United States for ginning long staple cotton because they have an advantage in that they do not damage the fibers to the same extent as conventional and more common saw type gins.

Some of the reasons for the bearing failures and the shutdowns in roller gins came about because heretofore there has been an inadequate supply of oil or grease to maintain the main bearings of the gin and the bearings for the various reciprocating connecting rods adequately lubricated. In connection with the main bearings on the crank shaft, this member revolves at speeds of around 800 to 900 r.p.m. and this is sufficiently rapid to cause the lubricating oil or grease to be thrown outwardly of the bearings thus depriving the shaft and bearings of the proper lubrication and introducing extremely rapid wear on account of the high unit pressures developed on account of the extremely rapid reciprocating action of the parts driven by the crank shaft.

The vibration of the entire gin structure on account of the weight of the reciprocating knife and the associated parts connected thereto and the rapidity of the reciprocation thereof is so severe that it affects the entire structure of roller gins as constructed heretofore and has made it difficult to keep the entire apparatus in adjustment and in good working condition and free of bearing failures as referred to above.

A further difficulty in connection with previously known roller gins pertaining to the vertically reciprocating knife was that adjustment of this knife is ordinarily made on the individual links or connecting rods between the crank shaft and the knife. Such links or connecting rods were usualy located where they were difficult to reach and to adjust with any degree of accuracy, thus requiring an excessive amount of down time for such adjustments and with the adujstments being less accurately made than could be desired.

In connection with the reciprocating knife structure and the drive therefor, it is, accordingly, a particular object to provide an arrangement which is more easily and more accurately adjusted than has heretofore been possible and one in which the critical bearings at the crank shaft ends of the connecting rods are adequately lubricated at all times.

Another object of this invention is the provision of an arrangement for supplying lubricant under pressure to the bearings that connect the crank shaft with the reciprocating knife structure in a roller gin in which operation of the gin is prevented unless adequate pressure is maintained on the lubricant.

Another object of this invention is the provision in which an adequate supply of lubricant is had at all times to the bearings on the crank shaft and the connecting rods for the reciprocating knife structure so that simple bearing liners of the automotive type can be employed but where an increased bearing life is had due to the adequate lubricant supply thereto.

Another object is the provision of a lubricating arrangement for roller gins in which the bearings at both ends of the connecting rods connecting the reciprocating knife structure with the crank shaft is by way of one and the same pressure supply thereby ensuring adequate lubrication to all of the critical bearings pertaining to the knife structure.

Roller gins at points other than the reciprocating knife structure have bearings which heretofore have provided metal to metal contact but which bearings journal oscillating members together. Some of these bearings are subjected to severe loads and to excessive vibration due to the nature of the movement transmitted through the bearings. With metal bearings it has been necessary to lubricate such bearings, but maintaining an adequate lubricant supply thereto has proved to be quite difficult thus leading to the extremely rapid deterioration of such bearings requiring replacement of the bearings and introducing additional noise and vibration and shock loads to parts of the apparatus pertaining to the bearings. Also, as the bearings wear and clearances about bearings increase, oil or grease tends to seep out and this will produce an undesirable contamination of the cotton and seed.

Accordingly, a still further object of this invention is the provision of bushings or bearings at oscillated pivot points of the roller gin of the type requiring no lubrication, and which do not wear and which tend to damp extreme vibrations rather than transmitting the shocks from metal part of the apparatus into the next adjacent part.

Another object is the provision in a roller cotton gin of resilient bushings, particularly at oscillating pivot points which will adequately transmit operating forces but which will tend to damp out vibrations which will particularly occur at the point of reversal of motion of the driven parts.

Figure 2:
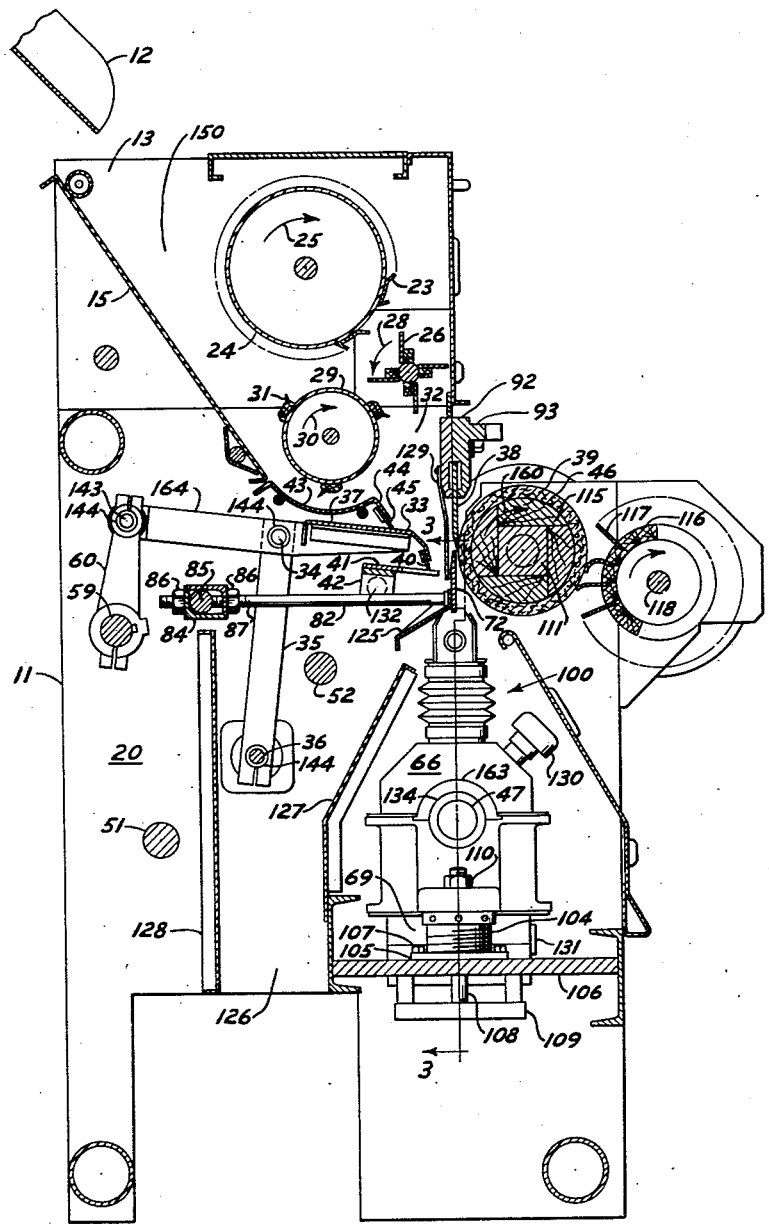
Figure 3:
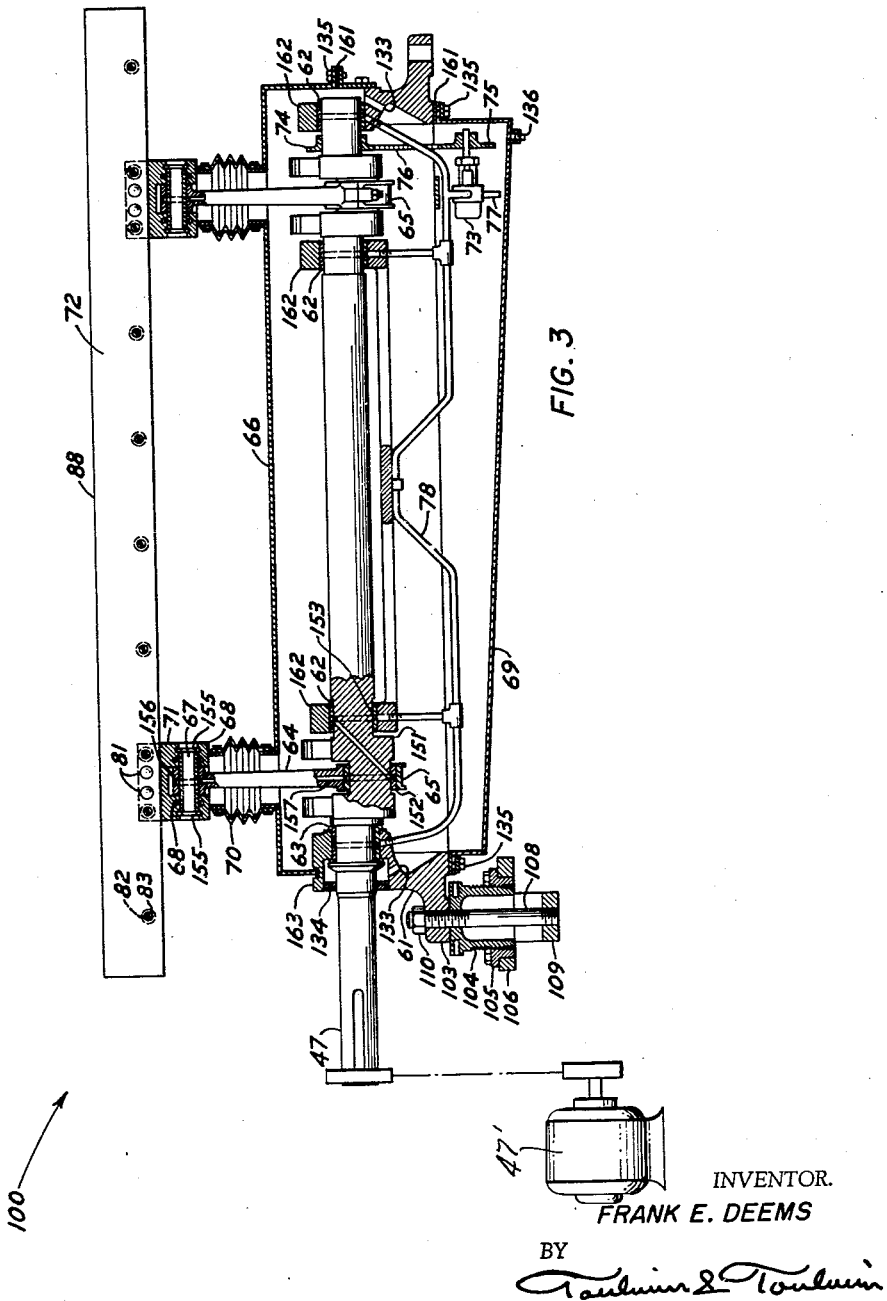
Figure 4:
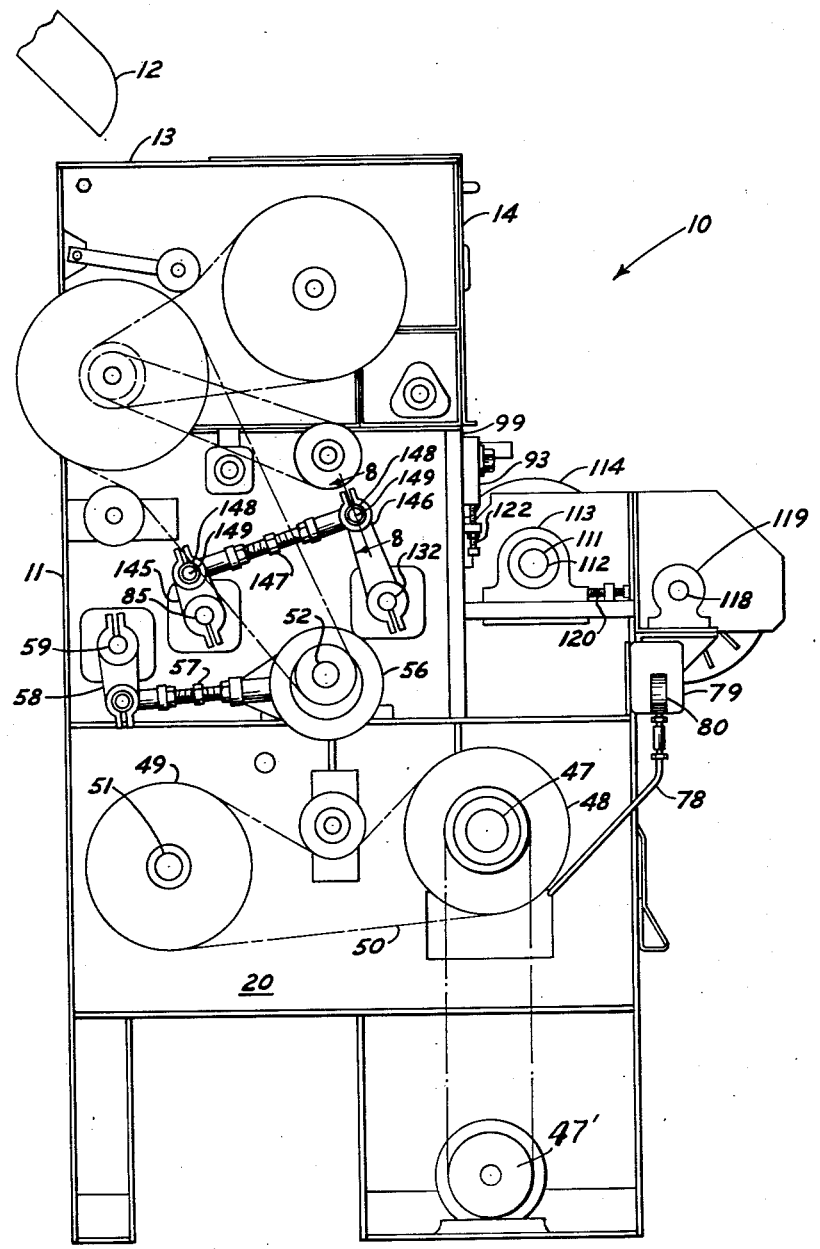
Figure 5:
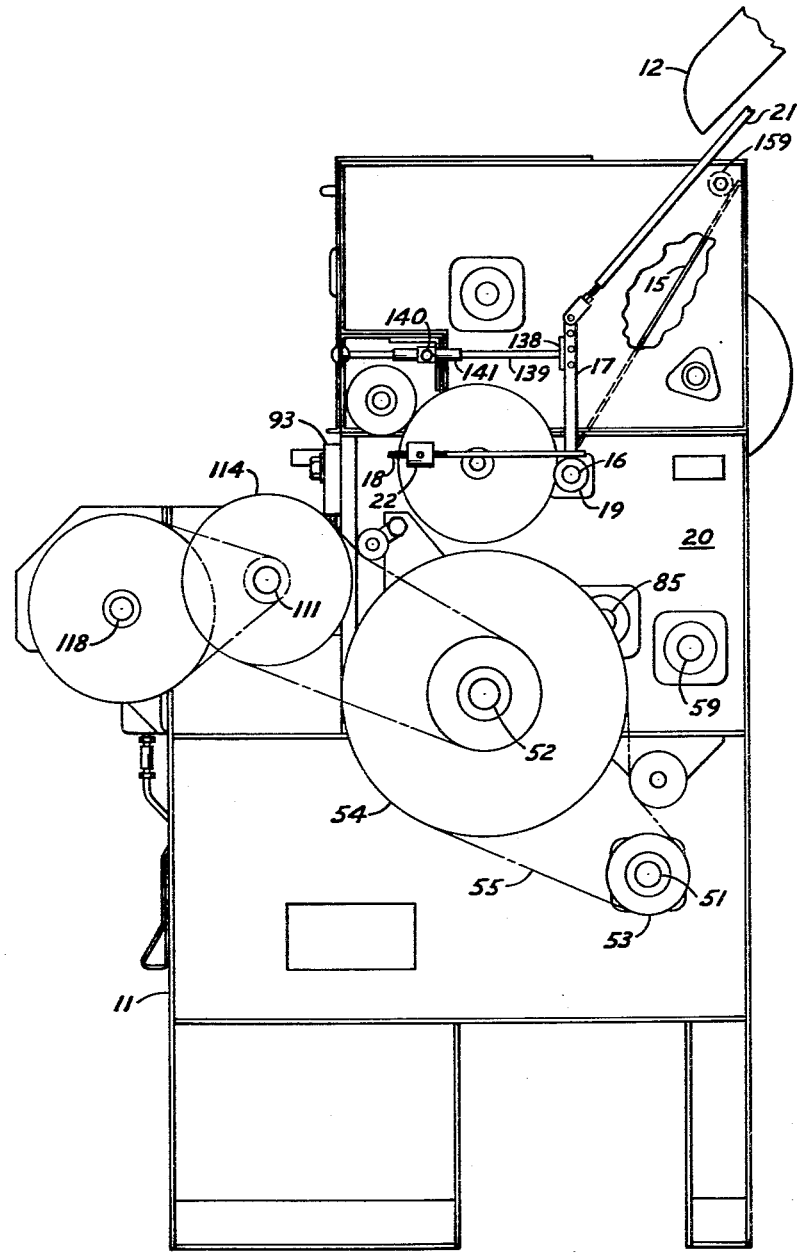
Figure 8:
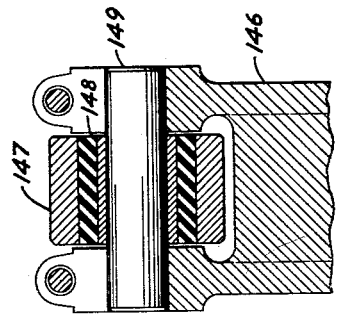
Figure 9:
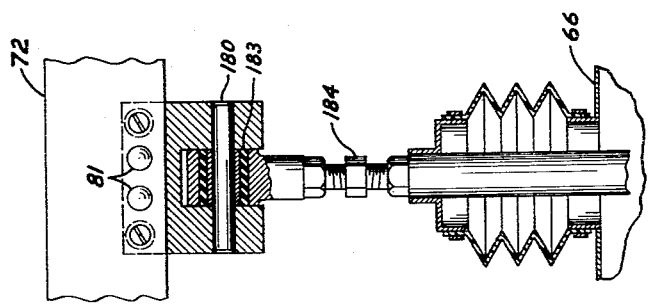
Figure 10:
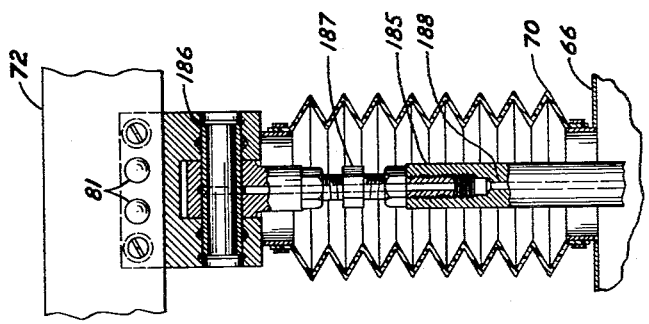

These and other objects and advantages will become more apparent upon reference to the accompanying drawings in which:

FIGURE 1 is a front elevational view of a roller gin constructed in accordance with my invention, FIGURE 2 is a vertical longitudinal section taken through the roller gin and is indicated by line 2—2 on FIGURE 1, FIGURE 3 is a fragmentary transverse sectional view indicated by line 3—3 on FIGURE 2, FIGURE 4 is an end elevational view looking in from the left side of FIGURE 1 showing some of the drive mechanism on the outside of the roller gin, FIGURE 5 is a view like FIGURE 4 but looking in from the right side of FIGURE 1 showing some of the automatic feed control mechanism and other parts of the drive train of the machine, FIGURE 6 is a fragmentary elevational view of the doctor knife assembly, FIGURE 7 is a vertical sectional view through the doctor knife assembly indicated by line 7—7 on FIGURE 6, FIGURE 8 is a sectional view indicated by line 8—8 on FIGURE 4 showing a resilient bushing arrangement at an oscillating bearing of the machine, FIGURE 9 is a sectional view along one of the crank shafts that drives the vertically reciprocating knife showing a modified form of resilient sealing sleeve about the connecting rod and the use of a resilient bushing about the wrist pin of the connecting rod, and FIGURE 10 is a sectional view similar to FIGURE 9 but showing the resilient sleeve extending the full length of the connecting rod.

Referring to the drawings somewhat more in detail, a roller cotton gin according to the present invention is generally indicated by reference numeral 10. The gin comprises a sheet metal housing 11 having end parts 20 at the sides of the machine on which the several shafts of the apparatus are supported in suitable bearings. The gin is usually preceded by pretreatment machinery such as a seed cotton cleaner, and the seed cotton to be ginned is delivered from such pretreatment machinery via spout or chute 12 into feed opening 13 of feed section 14 of the gin. This opening can also be availed of for manual feeding of lint, if so desired.

The cotton is delivered into a depository 150 between an inclined feed plate 15 and the spiked feed roller 29. The depository or hopper portion 150 has only 3 walls and is open in the back so the feed plate 15 can move between the side walls. Plate 15 is attached to a shaft 16 that is pivotally supported in end members 20 and extends through one thereof, as will be seen in FIGURE 5. On the end of shaft 16 is attached a feed control lever 17 and a threaded counterweight rod 18 which are welded to a collar 19 adjustably attached to the end of the shaft.

Lever 17 is connected by a link 21 to a feed control means pertaining to the pretreatment machinery referred to above so that when the weight of the cotton in depository 150 depresses the feed plate 15, this causes the shaft 16 to rotate clockwise as it is viewed in FIGURE 5 thereby moving lever 17 to reduce or shut off the feed along spout 12 to the roller gin. When the surplus amount has been passed from the depository space into the roller gin, the feed plate 15 moves back upwardly under the influence of counterweight 22 on rod 18 with the feed plate stopping against stop 159 in its uppermost position and whereupon lever 17 and link 21 are moved to restore the feed from the pretreatment machine to the roller gin.

The position of lever 17 when plate 15 is in an upper position is controlled by a rod 139 having an end member 138 abutted by lever 17 with the said rod being slidably mounted on the adjacent housing part 20 by means of a bracket 142 and sleeve 141. Screw 140 in a threaded hole in sleeve 141 serves to clamp the rod 139 in any preselected position.

The rod 139 can be availed of for manual actuation of the feed plate by loosening clamp screw 140 and utilizing the knob at the outer end of the rod for shifting the rod axially. Pushing the rod inwardly, for example, will tilt plate 15 backwardly and reduce the supply of cotton to the depository.

It will be evident that the critical positioning of counterweight 22 obtainable on rod 18 will permit control of the amount of cotton required to actuate the feed control mechanism. The seed cotton fed into the machine and sliding down feed plate 15 banks up against the spike roller 29 which is revolving clockwise as it is viewed in FIGURE 2, as indicated by arrow 30, whereupon spikes 31 will lift the cotton over the top of the roller 29 and drop it into the space 32 between fixed doctor knife 38 and an oscillating pusher assembly 33. Cotton on the spikes in excess of what is to be dropped behind the doctor knife is stripped from roller 29 by cleats 23 on the clockwise rotating stripper roller 24. Arrow 25 indicates the direction of rotation of this stripper roller. A doffing roller 26 rotating counterclockwise, as indicated by arrow 28, doffs the cotton remaining on spikes 31 of the feed roller and which cotton then drops into the space 32 referred to.

The pusher assembly 33 comprises an inverted channel table member 37 extending parallel to doctor knife 38 and the axis of roller 39. Member 37, which is about the same length as the ginning roller, is affixed near each end to supporting members 164 extending rearwardly away from knife 38 and roller 39 as shown in FIGURE 2. Each of the members 164 is pivotally connected near the mid-point to vertical arms 35 by shafts 34 and resilient bushings 144 and at the rearmost ends they are pivotally connected by shaft 143 and resilient bushing 144 to arm 60 which is keyed to oscillating shaft 59.

The lower end of arm 35 can be pivotally connected to shaft 36 by resilient bushing 144 also. Both the slight oscillating movement and the vibration shocks are absorbed by the resilient bushing 144 itself in each of these connections.

A flexible steel strip 40 along the front lower edge of the channel shaped member 37 engages upper surface 41 of a seed finger assembly 42 that is mounted on pivot shaft 132 mounted in the end members 20 of the casing of the apparatus.

Extending downwardly from the lower edge of inclined feed plate 15 and curving beneath feed roller 29 and terminating above member 37 is an arcuate pan member 43 having its edge portions turned downwardly and extending parallel with the doctor knife. This member holds the cotton against the spikes 31 of feed roller 29. The front edge 44 of member 43 also carries a seal strip 45 that engages the top of member 37 of the pusher assembly. The seal strips 40 and 45 above referred to prevent the escape of seed cotton on the forward stroke of the pusher assembly.

On each forward stroke of the pusher assembly the cotton at the front side of the pusher assembly is pushed against the friction surface 46 of the gin roller 39 which rotates clockwise as indicated by arrow 160 in FIGURE 2. The action of the gin roller is to draw the lint fibers between stationary doctor knife 38 and surface 46 of the roller so that the attached seeds are drawn against the lower edge 27 of the doctor knife. The cotton seed are too large to pass between the doctor knife and the surface of roller 39 and are thus dislodged from the cotton lint at edge 27 of the doctor knife each time knife 72 moves upwardly. Knife 72 is the uppermost portion of a reciprocating unit 100 and the operation of this knife accomplishes the desired ginning operation.

The released or ginned seed falls through spaces 123 (see FIGURE 1) between seed fingers 124 of a seed finger assembly 42 which is mounted on a shaft 132 and continuously oscillated thereby. The spaces 123, as is known, are of such a width as to permit clean seed to pass therethrough while preventing the passage of seed cotton.

The reciprocating unit 100 that actuates the knife above referred to includes a crank shaft 47 which, as will best be seen in FIGURE 4, has a pulley 48 mounted thereon that is driven by a belt 50 that passes over pulley 49 on a counter shaft 51. Counter shaft 51 extends transversely through the machine and at its opposite end has a pulley 53 thereon that drives a belt 55 that passes around a second pulley 54 that is attached to a second shaft 52 also extending transversely through the machine. The last mentioned pulleys and belts will be seen in FIGURE 5.

Shaft 52, on the side of the machine illustrated in FIGURE 4, has an eccentric thereon at 56 that drives an adjustable link 57 in reciprocation and which link is connected to the end of an arm 58 attached to shaft 59. Shaft 59, as has previously been mentioned, is connected with arm 60 that actuates the pusher assembly through connecting shaft 143 and resilient bearing 144.

The drive ratio between shaft 51 and shaft 52, and which also represents the ratio between the speed of rotation of crank shaft 47 and the rate of oscillation of the pusher assembly may be on the order of 3.5:1.

Any of the several shafts can be driven to supply power to the machine and, as shown in FIGURE 1, there may be a motor 47' connected to drive crankshaft 47.

The vertically reciprocating unit 100 previously referred to is shown in section in FIGURE 3, where it will be seen that the crank shaft 47 is journaled in a base block 61 by sleeve bearings 62 with there being a thrust bearing 63 at at least one end of the crank shaft. The crank shaft comprises throws on which connecting rods 64 are mounted by the connecting rod bearing caps 65. These rods extend vertically upwardly and at their upper ends carry wrist pins 67 retained in place by retainer snap rings 155, with there being resilient annular oil seals which may, for example, be rubberlike O rings located inwardly of the ends of the wrist pins. Attached to the bottom of base block 61 is an oil pan 69 and attached to the top thereof is a crank case cover 66. Expansible elements 70 are attached to the top of crank case cover 66 and extend upwardly in surounding relation to the connecting rods 64. At their upper ends the expansible elements are attached to the piston pin housings 71 which are, in turn, attached to the vertically reciprocating knife 72.

The degree of vertical reciprocation of knife 72 is sufficient to create the ginning action previously referred to on the upstroke while on the down stroke of the knife the face of ginning roller 29 is adequately exposed to permit it to draw the cotton upwardly against the stationary doctor knife.

Located within the oil pin 69 is an oil pump 73 preferably driven from crank shaft 47 by the sprocket and chain arrangement 74, 75, 76. This pump picks up oil from the oil pan through intake fitting 77 and delivers it under pressure to the crank shaft bearings 152 and the bearings of the wrist pins 67 by means of grooves 153 in bearings 62 and via oil ducts or passages 151 that run through the crank shaft to the connecting rod bearings 152 whence the oil passes upwardly through the connecting rods through passages or ducts 157 to the bearings of the wrist pins. The wrist pin bearings are indicated at 156 and it will be apparent that they are sealed by the annular seal 68 so that substantial pressure can be developed on the bearings.

The supply of lubricant under pressure to the grooves 153 is by way of conduit 78 leading to the discharge side of pump 73.

A feature of the present invention resides in the connection of a pressure switch 79 (see FIGURE 1) to the discharge side of pump 73. Should the oil pressure fall below a predetermined desired level, switch 79 will open and the electric drive motor for the apparatus will be deenergized and the operation of the gin will be interrupted before any of the important primary bearings fail or are damaged from lack of lubricant. Pressure switch 79 may be associated with gauge 80 to give a visual indication of the oil pressure, if desired.

The electric motor, which is not shown in the drawings, may be geared or belted to the extension of shaft 51 on the right side of FIGURE 1.

Gasket material 161 may be utilized to seal pan 69 and cover 66 to the base member 61 thereby ensuring against leakage of oil.

The expansible elements of closure 70 seal between the cover 66 and the piston pin housing 71 so that oil does not splash out of the crank case and also so that dirt and dust cannot enter the crank case. Oil that may seep out at the ends of the wrist pin bearings drains directly downwardly into the oil pan while oil that may leak out through the end bearings is drained back into the oil pan through drain holes 133 at the ends of block 61. Where crank shaft 47 enters the crank case an oil seal 134 of conventional nature may be provided. The cover 66 and oil pan 69 may be attached to the crank case by cap screws 135 and a drain plug 136 is provided for draining the oil pan when desired.

The crank case cover 66 preferably has a spout with a cover 130 through which the crank case can be filled and which may also constitute a breather to relieve varying pressures within the crank case. An oil level window 131 may be provided to give a direct indication of the oil level within the crank case.

Due to the stresses established between knife 72 and the piston pin housing 71, the connection therebetween is preferably by rivets 81 thus assuring a tight connection between these elements.

As will be seen in FIGURES 2 and 3, there extend backwardly from knife 72 a plurality of parallel substantially horizontal rods 82 attached to the knife by cap screws 83 and connected at their ends opposite the knife to a beamlike member 84 extending transversely of the apparatus.

Member 84 is attached to shaft means 85 journaled in the casing ends 20.

As will be seen in FIGURE 4, there is an arm 145 fixed to a projecting end of shaft means 85 and at the upper end of arm 145 there is attached a link 147, the opposite end of which is attached to arm 146 which is secured to the shaft 132 previously referred to and which pertains to the seed finger assembly. This link 147 is adjustable as to length and there are resilient bushings 148 surrounding the connecting shafts 149 that connect the link with the arms so that vibrations set up when the machine is operating are damped out. It will be evident that whenever knife 72 is reciprocating vertically, the seed finger assembly is caused to oscillate thereby.

In order to obtain the proper lateral setting of knife 72 relative to knife 38, there are provided lock nuts 86 on a threaded end portion 87 of rods 82 so that the rods can be adjusted in the beamlike member 84 to effect the desired setting of knife 72.

The provision of the rods 82 also cause knife 72 to reciprocate in the direction of an arc struck about the center of shaft 85 and this action serves to dislodge any seed pulled against the lower edge 27 of doctor knife 38 as the ginning roller 39 rotates.

FIGURES 6 and 7 show details in connection with the structure and support for the doctor knife 38. The doctor knife is positioned with its upper edge located between a backing strip 92 and a beam 93 that are secured together by cap screws 96. There are dowel pins 90 in the doctor blade supported swingably on ledges 94 and 95 on the inside faces of the backing strip 92 and beam 93. Endwise movement of the knife is limited by screws 97 extending across the space 91 that receives the back edge of the knife. The beam 93 has a projecting portion 98 that serves to stiffen the beam and at the opposite ends of the beam 93 bolts secure the entire doctor knife assembly to the heavy vertical frame portion 99 of the housing 11.

To provide for adjustment of the doctor knife so that the lower portion 102 thereof will bear against the surface 46 of the ginning roller 39 properly, there are screws 101 in beam 93 engaging the upper side 137 of the doctor knife. Adjustment of these screws will permit rapid and accurate adjustment of the knife to maintain the proper pressure against the ginning roller from end to end. A clearance space 154 is provided between beam 93 and the doctor knife so that the knife will not bind and when the knife is adjusted, it rocks about corner 158 of the backing strip 92.

Returning now to the vertically reciprocating unit 100, base block 61 has bosses or ears 103 thereon that rest on adjusting screws 104 that are threaded into plates 105 which are bolted to stationary frame structure 106 as by bolts or cap screws 107.

The studs 108 extend between support portions 109 and the bosses or ears 103 and have nuts 110 thereon clamping the unit tight in any adjusted position. These studs also serve as locating dowels whereby the adjustable frame is accurately positioned laterally and transversely at all times in all positions of vertical adjustment.

It will be apparent that the described structure provides for ready vertical adjustment of the entire reciprocating knife structure at any time depending upon the type of cotton being ginned. In general, the upper edge 88 of moving knife 72 will just clear the beveled portion 89 at the lower edge of the doctor knife on the side opposite the ginning roller and will overlap the doctor knife about ⅝ inch at the uppermost limit of travel of the moving knife. This adjustment is critical, however, because the actual amount of overlap must be varied with the staple length of the cotton being ginned to obtain effective removal of the seed from the fiber. By the described arrangement this adjustment can rapidly and easily be made and the adjustment can also be made quite precisely at any time.

The ginning roller 39 which cooperates with doctor knife 38 is of the usual construction, having a square shaft 111 having round extensions 112, journaled in bearings 113 and to which may be attached drive pulleys 114. The shaft is surrounded by arcuate wooden segments 115 and thereon is mounted the friction material 46 which forms the working surface of the ginning roller.

Doffing roller 116 which clears the surface of the ginning roller has flexible wiper strips 117 and is mounted on a shaft 118 that is journaled in bearing 119.

The ginning roller itself can be adjusted, as will be seen in FIGURE 4, by mounting the bearings 113 in slots in the frame and providing the jack screws 120 which hold the roller in fixed relation to the doctor knife. Similarly, as will also be seen in FIGURE 4, the doctor knife assembly may be supported in any predetermined elevated position by the jack screws 122. The slots 121 in the ends of beam 93 permit this vertical adjustment to be made.

Briefly to review the operation of the described roller gin, seed cotton delivered to space 32 is pushed forwardly by the pusher assembly until the fibers are engaged by the friction surface of the ginning roller. This occurs on each down stroke of the vertically reciprocating knife. The roller pulls the fibers under the lower portion of the doctor knife and the seeds, which are too large to pass between the knife and the roller, are stopped by the lower edge of the knife. On the upward stroke of the vertically reciprocating knife the seed are pushed upwardly while the roller is pulling on the cotton fiber and the seed are thus separated from the fiber.

As this operation continues, each seed is stripped of fiber and falls on the seed finger assembly. The seed finger assembly oscillates and the seed falls between the fingers and into the seed discharge chute 125 and thence through seed chute 126 formed by walls 127 and 128 and to a conveying apparatus not illustrated in the drawings.

The lint that passes around the ginning roller is doffed by doffing roller 116 and is received in some suitable conveyor or receiving apparatus.

Relatively narrow metal strips extend downwardly in front of the knives and are indicated at 129 and serve to keep the lint from jamming between the ends of the knives and the inside of the ends 20 of the housing.

The principal embodiment illustrated and described above shows the connecting rods leading from the crank shaft 47 to the vertically reciprocating knife completely sealed and of fixed length.

FIGURES 9 and 10 show somewhat modified constructions. In FIGURE 9 the wrist pin 180 at the upper end of the connecting rod is supported in a resilient bushing 183. Since the angle of oscillation at this point of the mechanism is relatively small, this provides adequate journaling without lubrication and likewise tends to damp out vibrations. The connecting rod in FIGURE 9 also comprises a right and left hand turn buckle 184 by means of which the length of the connecting rod can be adjusted in addition to the adjustment provided at the base of the machine, if so desired.

In FIGURE 10 the connecting rod 185 is supported in a metal sleeve bearing at its wrist pin end, as with the principal embodiment, but the connecting rod includes a turn buckle 187 for adjusting the length thereof at the time the machine is assembled. This turn buckle is drilled so that the oil passage 188 in the connecting rod is continuous from the lower end up to wrist pin bearing 186.

From the foregoing it will be seen that the present invention provides for substantial improvements in roller gins, tending to reduce maintenance, increase service life, eliminate vibration, and permit all essential and critical adjustments to be made readily and rapidly and accurately.

It will be understood that other modifications could be made in the structure illustrated in order to adapt it to different usages and, accordingly, the specific details of construction and arrangement of parts are exemplary and are not to be construed as strictly limiting the scope of the invention.

I claim:

1. In a roller cotton gin; a stationary doctor knife, means for drawing lint cotton over the lower edge of said doctor knife, a vertically reciprocating knife located beneath the doctor knife, a crank shaft beneath the reciprocating knife, connecting rods connecting the crank shaft with the reciprocating knife so that rotation of the crank shaft will move the reciprocating knife vertically past the lower edge of the doctor knife to dislodge seed from the cotton, a frame supporting the crank shaft, bearings for the crankshaft and connecting rods, a housing attached to the frame and completely enclosing the crank shaft and the connecting rods, lubricant in the housing, and means for supplying the lubricant to the crank shaft and connecting rod bearings under pressure, said housing being sealingly connected to said vertically reciprocating knife to confine the lubrication system to the interior of the housing.

2. In a roller cotton gin; a stationary doctor knife, means for drawing lint cotton over the lower edge of said doctor knife, a vertically reciprocating knife located beneath the doctor knife, a crank shaft beneath the reciprocating knife, connecting rods connecting the crank shaft with the reciprocating knife so that rotation of the crank shaft will move the reciprocating knife vertically past the lower edge of the doctor knife to dislodge seed from the cotton, a frame supporting the crank shaft, and a housing attached to the frame and completely enclosing the crank shaft and the connecting rods and containing lubricant supplied to the crank shaft and connecting rod bearings under pressure, there being blocks attached to said reciprocating knife to which the upper ends of the connecting rods are connected, and said housing including flexible portions attached to the blocks.

3. In a roller cotton gin; a housing adapted for receiving cotton to be ginned, a stationary vertically disposed transversely extending doctor knife, a ginning roller adjacent the doctor knife operable to draw the lint cotton to be ginned around the lower edge of the doctor knife, a vertically reciprocating knife beneath the doctor knife, a crank shaft beneath the vertically reciprocating knife, connecting rods connecting the crank shaft with spaced points of the reciprocating knife so that rotation of the crank shaft will reciprocate the knife vertically to dislodge seed from the cotton which has been drawn around the lower edge of the doctor knife thereby to carry out the desired ginning operation, a base member rotatably supporting the said crank shaft, and threaded means supporting opposite ends of the said base member for vertical adjustability thereof relative to said housing and doctor knife thereby to adjust the region in which the reciprocating knife operates, each said threaded support means comprising a hollow nut bearing against the bottom of said base member and adjustable in a stationary support, a rod extending upwardly through said hollow nut and the base member and fixed to the stationary support, and a clamping nut threaded to the upper end of said rod for locking the base member to the hollow nut and for clamping the hollow nut in its adjusted position.

4. In a roller cotton gin; a housing adapted for receiving cotton to be ginned, a stationary doctor knife in the housing vertically disposed and extending transversely of the housing, means comprising a ginning roller operable for drawing lint cotton over the lower edge of the doctor knife, a vertically reciprocating knife in the housing beneath the doctor knife, a crank shaft beneath the reciprocating knife, spaced connecting rods connecting the crank shaft with the reciprocating knife so that rotation of the crank shaft will cause the reciprocating knife to reciprocate vertically relative to the doctor knife and perform a ginning operation on the cotton drawn about the lower edge of the doctor knife, a base member rotatably supporting the crank shaft, means supporting the ends of the base member for vertical adjustability thereof thereby to vary the region in which the vertically reciprocating knife works, a housing attached to the base member and completely enclosing said crank shaft and including flexible tubular portions enclosing said connecting rods, an oil pump in the housing, and conduits leading from the pump to the crank shaft bearings and to the connecting rod bearings for a supply of lubricant thereto under pressure.

5. In a roller cotton gin; a housing adapted for receiving cotton to be ginned, a stationary doctor knife in the housing vertically disposed and extending transversely of the housing, means comprising a ginning roller operable for drawing lint cotton over the lower edge of the doctor knife, a vertically reciprocating knife in the housing beneath the doctor knife, a crank shaft beneath the reciprocating knife, spaced connecting rods connecting the crank shaft with the reciprocating knife so that rotation of the crank shaft will cause the reciprocating knife to reciprocate vertically relative to the doctor knife and perform a ginning operation on the cotton drawn about the lower edge of the doctor knife, a base member rotatably supporting the crank shaft, means supporting the ends of the base member for vertical adjustability thereof thereby to vary the region in which the vertically reciprocating knife works, a housing attached to the base member and completely enclosing said crank shaft and the connecting rods, an oil pump in the housing, and conduits leading from the pump to the crank shaft bearings and to the connecting rod bearings for a supply of lubricant thereto under pressure, there being a pressure switch connected with the discharge side of said pump adapted for being connected in circuit with a drive motor for said crank shaft so that whenever the pressure developed by the pump falls below a predetermined minimum value the energization of the motor can be interrupted by the switch.

6. In a roller cotton gin; a housing adapted for receiving cotton to be ginned, a transversely extending vertically disposed stationary doctor knife in the housing, a vertically reciprocating knife in the housing directly beneath the doctor knife and also extending transversely and vertically disposed, a crank shaft beneath the reciprocating knife having main bearings and pin bearings, blocks rigidly attached to the lower side of the reciprocating knife, connecting rods having their upper ends pivoted in said blocks and their lower ends attached to the pin bearings of said crank shaft, a base member engaging said main bearings and rotatably supporting the crank shaft, a lubricant housing mounted on the base member and completely enclosing the crank shaft, said lubricant housing comprising flexible sleeve elements surrounding the connecting rods and extending from the housing upwardly to said blocks, a lubricant supply in said lubricant housing, a pump driven by said crank shaft having its suction side communicating with the lubricant, conduit means leading from the discharge side of the pump to the crank shaft main bearings, and conduit means extending from at least some of said crank shaft main bearings through the crank shaft and through the connecting rods for supplying lubricant under pressure to both ends of the connecting rods.

7. In a roller cotton gin; a housing for receiving cotton to be ginned, a vertical doctor knife extending transversely in the housing, means for delivering the cotton to be ginned to one side of the doctor knife, a ginning roller on the opposite side of the doctor knife operable for drawing the cotton fibers about the lower edge of the doctor knife, a vertically reciprocating knife beneath the doctor knife operable for moving upwardly past the lower edge of the doctor knife to dislodge seed from the fibers that have been drawn around the lower edge of the doctor knife, a crank shaft located beneath the vertically reciprocating knife having spaced throws, blocks fixed in the lower edge of the vertically reciprocating knife vertically over said throws, connecting rods extending from the throws to the blocks, bearings between the upper ends of the connecting rods and the blocks and between the lower ends of the connecting rods and the said crank shaft throws, a base member supporting the crank shaft and there being bearings between the crank shaft and the base member, a lubricant housing attached to the base member containing lubricant and completely enclosing the crank shaft, said lubricant housing comprising extensible sleeve portions surrounding the connecting rods and having their upper ends attached to said blocks, a lubricant pump in the lubricant housing driven by the crank shaft and having discharge conduit means leading to the bearings between the base member and the crank shaft, at least one of said bearings adjacent each crank shaft throw having annular groove means to receive the lubricant, passage means extending from the groove means through the crank shaft to the surface of the adjacent crank shaft throw to supply lubricant to the connecting rod bearings, and passage means extending through each connecting rod to supply lubricant from the lower bearings thereof to the bearings between the connecting rods and the said blocks.

8. In a roller cotton gin; a housing for receiving cotton to be ginned, a vertical doctor knife extending transversely in the housing, means for delivering the cotton to be ginned to one side of the doctor knife, a ginning roller on the opposite side of the doctor knife operable for drawing the cotton fibers about the lower edge of the doctor knife, a vertically reciprocating knife beneath the doctor knife operable for moving upwardly past the lower edge of the doctor knife to dislodge seed from the fibers that have been drawn around the lower edge of the doctor knife, a crank shaft located beneath the vertically reciprocating knife having spaced throws, blocks fixed in the lower edge of the vertically reciprocating knife vertically over said throws, connecting rods extending from the throws to the blocks, bearings between the upper ends of the connecting rods and the blocks and between the lower ends of the connecting rods and the said crank shaft throws, a base member supporting the crank shaft and there being bearings between the crank shaft and the base member, a lubricant housing attached to the base member containing lubricant and completely enclosing the crank shaft, said lubricant housing comprising extensible sleeve portions surrounding the connecting rods and having their upper ends attached to said blocks, a lubricant pump in the lubricant housing driven by the crank shaft and having discharge conduit means leading to the bearings between the base member and the crank shaft, at least one of said bearings adjacent each crank shaft throw having annular groove means to receive the lubricant, passage means extending from the groove means through the crank shaft to the surface of the adjacent crank shaft throw to supply lubricant to the connecting rod bearings, and passage means extending through each connecting rod to supply lubricant from the lower bearings thereof to the bearings between the connecting rods and the said blocks, the bearings between the connecting rods and the said blocks being sealed to the said blocks outwardly from the supply of lubricant thereto.

9. In a roller cotton gin; a housing for receiving cotton to be ginned, a vertical doctor knife extending transversely in the housing, means for delivering the cotton to be ginned to one side of the doctor knife, a ginning roller on the opposite side of the doctor knife operable for drawing the cotton fibers about the lower edge of the doctor knife, a vertically reciprocating knife beneath the doctor knife operable for moving upwardly past the lower edge of the doctor knife to dislodge seed from the fibers that have been drawn around the lower edge of the doctor knife, a crank shaft located beneath the vertically reciprocating knife having spaced throws, blocks fixed in the lower edge of the vertically reciprocating knife vertically over said throws, connecting rods extending from the throws to the blocks, bearings between the upper ends of the connecting rods and the blocks and between the lower ends of the connecting rods and the said crank shaft throws, a base member supporting the crank shaft and there being bearings between the crank shaft and the base member, a lubricant housing attached to the base member containing lubricant and completely enclosing the crank shaft, said lubricant housing comprising extensible sleeve portions surrounding the connecting rods and having their upper ends attached to said blocks, a lubricant pump in the lubricant housing driven by the crank shaft and having discharge conduit means leading to the bearings between the base member and the crank shaft, at least one of said bearings adjacent each crank shaft throw having annular groove means to receive the lubricant, passage means extending from the groove means through the crank shaft to the surface of the adjacent crank shaft throw to supply lubricant to the connecting rod bearings, and passage means extending through each connecting rod to supply lubricant from the lower bearings thereof to the bearings between the connecting rods and the said blocks, the bearings between the connecting rods and the said blocks being sealed to the said blocks outwardly from the supply of lubricant thereto, each said connecting rod including threaded means intermediate its ends for adjustment of the length thereof, and the oil passage for each connecting rod passing directly through said threaded means.

10. In a roller cotton gin; a housing, means to supply cotton to be ginned to the housing, a vertically disposed transversely arranged stationary doctor knife in the housing, a rotatable ginning roller adjacent the doctor knife operable to draw cotton under the lower edge of the doctor knife, a vertically reciprocating knife beneath the doctor knife, means including a crank shaft attached to the reciprocating knife for reciprocating it relative to the doctor knife, means for adjusting the region in which the vertically reciprocating knife reciprocates, a support for said doctor knife, means attaching the support to said housing for vertical adjustability thereon, means connecting the doctor knife to said support for swinging movement thereof toward and away from said ginning roller for maintaining a predetermined relation between the doctor knife and the ginning roller, said last mentioned means comprising a pocket in the support into which the back edge of the doctor knife extends, means pivotally connecting the doctor knife to the support adjacent the lower edge of said pocket, and adjustment screw means threaded into the support and extending into the said pocket and abutting said knife adjustable for pivotally adjusting the doctor knife in said support.

11. In a roller cotton gin; a housing having ginning means adjacent one side, an inlet for receiving cotton adjacent the other side of the housing and located above the ginning means, an inclined feed plate forming a lower wall for the housing over which the cotton to be ginned is fed from the inlet opening toward the said ginning means, means rotatably supporting the lower end of said plate in the housing including a shaft extending through one wall of the housing, counterbalance means adjustably attached to said shaft continuously urging said plate toward an upwardly tilted position, stop means stopping said plate in its upper position, the described arrangement providing for the tilting downwardly of the feed plate forming a lower wall for the housing when a predetermined weight of cotton is resting thereon, and control means connected with said shaft operable for reducing the supply of cotton to said inlet in response to downward tilting movements of said plate, there being manual means selectively operable for actuating said control means to reduce the supply of cotton to said inlet, and adjustable for predetermining the rate of supply of cotton to said inlet.

12. In a roller cotton gin; a housing having an inlet for receiving cotton to be ginned, ginning means in said housing comprising a stationary doctor knife, a rotary ginning roller adjacent the doctor knife on the side opposite the supply of lint cotton to the doctor knife to draw the cotton around the lower edge of the doctor knife, and a vertically reciprocating knife below the said doctor knife, there being means for driving said vertically reciprocating knife in vertical reciprocation, and means for guiding the vertically reciprocating knife in its vertical travel comprising a plurality of rod members attached thereto and extending substantially horizontally therefrom, a beam into which the ends of the rods opposite the vertically reciprocating knife extend, means adjustably connecting the rods with the beam, means rotatably supporting the beam in the housing, a finger seed plate beneath the doctor knife on which the seeds dislodged by the ginning operation fall, shaft means rotatably supporting the seed plate in the housing, arms attached to the said beam and to the said shaft means, an adjustable link connecting said arms so that reciprocation of said vertically reciprocating knife will be accompanied by oscillation of the seed plate, and resilient bushing means between the arms and said link for damping out vibrations caused by high speed of operation of the gin.

13. In a roller cotton gin; a housing, a feed opening for receiving cotton to be ginned, an inclined feed plate over which the cotton moves, ginning means adjacent the lower portion of the feed plate, a space between the lower portion of the feed plate and the ginning means to which the cotton is delivered for being operated by the ginning means, a reciprocating pusher member in said space movable toward and away from said ginning means to advance the cotton thereto, arms extending backwardly from said pusher member, support levers pivotally connected with intermediate portions of said arms and pivotally supported in said housing, drive arms connected to the rear ends of the arms extending from the pusher member, a shaft supporting said drive arms and pivotally mounted in the housing, another drive arm on the shaft externally of the housing, a reciprocating drive link connected to the last mentioned drive arm, and resilient bushing means interposed between the drive link and the said last mentioned drive arm and between the said drive arms on the shaft and the said arms extending rearwardly from the pusher member whereby vibrations caused by operation of the gin are damped out, there also being resilient bushing means between the said support levers and the pivotal support thereof in said housing and also between the support levers and the said arms extending rearwardly from the pusher member.

14. In a roller cotton gin; a housing, a feed opening for receiving cotton to be ginned, an inclined feed plate over which the cotton moves, ginning means adjacent the lower portion of the feed plate, a space between the lower portion of the feed plate and the ginning means to which the cotton is delivered for being operated by the ginning means, a reciprocating pusher member in said space movable toward and away from said ginning means to advance the cotton thereto, arms extending backwardly from said pusher member, support levers pivotally connected with intermediate portions of said arms and pivotally supported in said housing, first drive arms connected to the rear ends of the arms extending from the pusher member, a shaft supporting said first drive arms and pivotally mounted in the housing, a second drive arm on the shaft externally of the housing, a reciprocating drive link connected to the last mentioned second drive arm, and resilient bushing means interposed between the drive link and the said second drive arm and between the said first drive arms on the shaft and the said arms extending rearwardly from the pusher member whereby vibrations caused by operation of the gin are damped out, said ginning means comprising a vertically reciprocating knife and there being a common drive for both the vertically reciprocating knife and the said reciprocating link maintaining a predetermined speed ratio therebetween, there also being resilient bushing means between the said support levers and the pivotal support thereof in said housing and also between the support levers and the said arms extending rearwardly from the pusher member.

15. In a roller cotton gin; a housing, a feed inlet in an upper part of said housing at one side, ginning means in the housing at the lower point toward the other side, an inclined feed plate extending from the said inlet downwardly at an angle within the housing toward the ginning means, there being a space adjacent the lower portion of the feed plate and ahead of the ginning means for receiving the cotton to be ginned, a feed roller adjacent the space for delivering cotton from the feed plate to the space, and a doffing wheel adjacent the roller for removing locks of cotton therefrom, a reciprocating pusher member in said space for moving the cotton into operative relation with said ginning means, arms extending backwardly from said pusher member, support levers pivotally connected with intermediate portions of said arms and pivotally supported in said housing, said ginning means comprising a vertically reciprocating knife, a rotatable crank shaft driving said knife in vertical reciprocation, and a drive from said crank shaft to said reciprocating pusher member, said drive comprising an eccentric rotated by the crank shaft, a link driven in reciprocation by the eccentric, a rock shaft in the housing, drive arms on the rock shaft connecting the rock shaft with the link and with the ends of the arms extending rearwardly from said pusher member, and resilient bushings connecting the link with its drive arm and the other drive arms with the said arms extending rearwardly from said pusher member for damping out vibrations resulting from the rapid reciprocating movements of the link and pusher member, there also being resilient bushing means between the said support levers and the pivotal support thereof in said housing and also between the support levers and the said arms extending rearwardly from the pusher member.

16. In a roller cotton gin; a housing, a feed inlet in an upper part of said housing at one side, ginning means in the housing at the lower point toward the other side, an inclined feed plate extending from the said inlet downwardly at an angle within the housing toward the ginning means, there being a space adjacent the lower portion of the feed plate and ahead of the ginning means for receiving the cotton to be ginned, a feed roller adjacent the space for delivering cotton from the feed plate to the space, and a doffing wheel adjacent the roller for removing locks of cotton therefrom, a reciprocating pusher member in said space for moving the cotton into operative relation with said ginning means, said ginning means comprising a vertically reciprocating knife, a rotatable crank shaft driving said knife in vertical reciprocation, and a drive from said crank shaft to said reciprocating pusher member, said drive comprising an eccentric rotated by the crank shaft, a link driven in reciprocation by the eccentric, a rock shaft in the housing, drive arms on the rock shaft connecting the rock shaft with the link and with the pusher member, and resilient bushings connecting the link with its drive arm and the other drive arms with the said pusher member for damping out vibrations resulting from the rapid reciprocating movements of the link and pusher member, the edge of the pusher member adjacent the ginning means being turned downwardly to present a substantially vertical surface to the cotton being pushed into the ginning means, a fingered seed plate at the lower edge of the said turned-down portion of the pusher member, a rock shaft supporting the seed plate, a drive arm on said last mentioned shaft, a reciprocating link connected with said drive arm for vibrating the seed plate via said rock shaft, and resilient bushing means between the said link and the said drive arm to damp out vibrations.

17. In a roller cotton gin; ginning means comprising a stationary doctor knife, a vertically reciprocating knife parallel with the doctor knife, a crank shaft having spaced throws for actuating the reciprocating knife, connecting rods mounted on the throws of the crank shaft and extending to the back of the reciprocating knife, blocks attached to the reciprocating knife, pins in the blocks connecting the ends of the connecting rods to the knife, a housing completely surrounding the crank shaft for retaining a supply of lubricant for the crank shaft bearings and the connecting rod bearings, apertures in the housing through which the connecting rods extend, and extensible sleeves connected at their lower ends to the housing and surrounding the connecting rods and having their upper ends sealingly connected to the connecting rods whereby to permit reciprocation of the connecting rods while maintaining the housing sealed.

18. In a roller cotton gin; ginning means comprising a stationary doctor knife, a vertically reciprocating knife parallel with the doctor knife, a crank shaft having spaced throws for actuating the reciprocating knife, connecting rods mounted on the throws of the crank shaft and extending to the back of the reciprocating knife, blocks attached to the reciprocating knife, pins in the blocks connecting the ends of the connecting rods to the knife, a housing completely surrounding the crank shaft for retaining a supply of lubricant for the crank shaft bearings and the connecting rod bearings, apertures in the housing through which the connecting rods extend, and extensible sleeves connected at their lower ends to the housing and surrounding the connecting rods and having their upper ends sealingly connected to the connecting rods whereby to permit reciprocation of the connecting rods while maintaining the housing sealed, said connecting rods having threaded means therein between their ends for adjusting the length of the connecting rods.

19. A roller cotton gin according to claim 18 in which the upper ends of the sleeves are connected to said blocks.

20. A roller cotton gin according to claim 18 in which the upper ends of the sleeves are connected to said connecting rods beneath the said threaded means therein.

(References on following page)

References Cited in the file of this patent

UNITED STATES PATENTS

| | | |
|---|---|---|
| 534,140 | Coleman | Feb. 12, 1895 |
| 619,425 | Marsden | Feb. 14, 1899 |
| 655,167 | Prior | Sept. 3, 1901 |
| 2,057,641 | Curley et al. | Oct. 13, 1936 |
| 2,118,975 | Hunt | May 31, 1938 |
| 2,880,027 | Everitt et al. | Mar. 31, 1959 |

OTHER REFERENCES

"Lubrication," magazine, July 1950, published by The Texas Co., New York, see page 77, only Figure 4 required. (Copy in Division 45, filed under 184–6 (N).)